(12) United States Patent
Lahijani

(10) Patent No.: US 8,247,486 B2
(45) Date of Patent: Aug. 21, 2012

(54) CREEP RESISTANT FLUOROPOLYMER

(75) Inventor: Jacob Lahijani, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 290 days.

(21) Appl. No.: 12/482,511

(22) Filed: Jun. 11, 2009

(65) Prior Publication Data

US 2010/0004374 A1 Jan. 7, 2010

Related U.S. Application Data

(60) Provisional application No. 61/077,286, filed on Jul. 1, 2008.

(51) Int. Cl.
*C08K 3/40* (2006.01)

(52) U.S. Cl. ........ 524/494; 524/495; 524/496; 524/544; 524/546

(58) Field of Classification Search ............ 524/494, 524/495, 496, 544, 546
See application file for complete search history.

(56) References Cited

U.S. PATENT DOCUMENTS

| | | | |
|---|---|---|---|
| 3,624,250 A | 11/1971 | Carlson | |
| 4,123,602 A | 10/1978 | Ukihashi et al. | |
| 4,163,742 A | 8/1979 | Mansure | |
| 4,380,618 A | 4/1983 | Khan et al. | |
| 4,414,356 A | 11/1983 | Michel | |
| 4,422,992 A * | 12/1983 | Michel | 264/108 |
| 4,513,129 A | 4/1985 | Nakagawa et al. | |
| 4,582,864 A * | 4/1986 | Abe et al. | 523/220 |
| 4,677,175 A | 6/1987 | Ihara et al. | |
| 4,743,658 A | 5/1988 | Imbalzano et al. | |
| 5,132,368 A * | 7/1992 | Chapman et al. | 525/165 |
| 5,604,285 A | 2/1997 | Miyamori et al. | |
| 5,705,120 A | 1/1998 | Ueno et al. | |
| 5,902,755 A * | 5/1999 | Driggett et al. | 442/172 |
| 6,288,372 B1 * | 9/2001 | Sandberg et al. | 219/544 |
| 7,183,342 B2 * | 2/2007 | Miyamoto et al. | 524/161 |
| 2003/0139534 A1 * | 7/2003 | Brothers et al. | 525/326.3 |
| 2003/0236370 A1 * | 12/2003 | Grootaert et al. | 526/253 |
| 2007/0276080 A1 * | 11/2007 | Lahijani | 524/494 |
| 2010/0261828 A1 * | 10/2010 | Tomoda et al. | 524/449 |

FOREIGN PATENT DOCUMENTS

| | | | |
|---|---|---|---|
| EP | 1 561 784 A1 | | 8/2005 |
| EP | 1561784 A1 * | | 8/2005 |
| JP | 2003-041083 | * | 2/2003 |
| WO | WO-2010/002592 A1 * | | 1/2010 |

OTHER PUBLICATIONS

International Search Report, PCT/US2009/047646/ Dated Sep. 8, 2009.

* cited by examiner

*Primary Examiner* — Peter D. Mulcahy
*Assistant Examiner* — Henry Hu

(57) ABSTRACT

Creep resistant fluoropolymer is made by blending a melt-fabricable fluoropolymer having a melt flow rate of no greater than about 7 g/10 min with milled carbon fiber and forming the resultant blend into an article, the carbon fiber content of the blend being from about 15 to 35 wt % based on the combined weight of the carbon fiber and the fluoropolymer.

9 Claims, No Drawings

CREEP RESISTANT FLUOROPOLYMER

BACKGROUND OF THE INVENTION

1. Field of the Invention

This invention relates to an improvement in the creep resistance of melt-fabricable fluoropolymers, and more particularly to an additive to the fluoropolymer that increases its creep resistance.

2. Description of Related Art

U.S. Pat. No. 4,163,742 (Mansure) discloses the blending of carbon fibers with melt-fabricable tetrafluoroethylene copolymer resin to improve resistance to creep. The copolymer resin has a melt viscosity of $10^4$ to $10^7$ poises at 380° C., which corresponds to a melt flow rate at 372° C. of about 0.1 to 50 g/10 min. and the fibers have an average length of at least 2 mm. The blending process involves the mixing together of the resin in particle form with the carbon fibers in a mixture of water and a water-miscible organic solvent, followed by filtering, drying to form a filter cake of the resin/fiber blend, and compression molding. Blend compositions containing up to 50 wt % carbon fiber are disclosed. U.S. Pat. No. 4,414,356 (Michel) discloses the practice of the same blending and compression molding processes, but requires the carbon fibers also having an average length of at least 2 mm to be free of surface treatment.

U.S. Pat. No. 4,422,992 (Michel) discloses that the Mansure process does not lend itself to acceptable continuous commercial production. The Michel process involves the co-feeding of (a) the melt-fabricable tetrafluoroethylene copolymer having the melt flow characteristics disclosed in Mansure and (b) continuous carbon fiber into a twin screw extruder, wherein the extruder chops the fiber into 1.5 to 3 mm lengths. Shorter fibers are disclosed to compromise the reinforcing characteristics of the fiber. The extruder melt blends the chopped fiber and the copolymer resin and extrudes the resultant blend through a 2 to 4 mm diameter die opening to avoid clogging and to align the carbon fibers in the extrusion direction within the matrix of copolymer resin to maximize the reinforcement provided by the carbon fiber. The carbon fiber content of the blend is 20-35 wt %, preferably 30-35 wt %.

U.S. Pat. No. 5,604,285 (Miyamori et al.) discloses the addition of both carbon fiber and metal powder to melt-processible fluoropolymer to obtain a reduced coefficient of friction while maintaining mechanical strength. The carbon fiber length is 80 to 3000 micrometers as determined from the disclosure of average fiber diameter of 10-30 micrometers and average aspect ratio of 8 to 300, preferably 20 to 300 micrometers. The fluoropolymer has its end groups stabilized either by reaction with ammonia to form amide end groups or by fluorination, which is known to form —$CF_3$ end groups. Injection molding is also disclosed.

U.S. Pat. No. 5,705,120 (Ueno) discloses inadequate wettability between polytetrafluoroethylene and carbon fiber and addresses this shortcoming by using a heat-treated carbon fiber, called graphite fiber, having a length of 50 micrometers to 5 mm, and having a surface treatment characterized by either carbon/oxygen ratio or by the presence of halogen or both. The fluororesin mixtures disclosed in Ueno contain 1 to 60 wt % of the specially treated graphite fiber. Compression molding and extrusion and injection molding are disclosed as fabrication methods, noting the importance of uniform admixing of the fluororesin and fiber ingredients. Only compression molding is used in the Examples.

There is a need for melt-fabricable tetrafluoroethylene copolymers that have substantially greater creep resistance than provided by the copolymer itself and that can be made by economical manufacture.

SUMMARY OF THE INVENTION

The present invention satisfies this need by the process comprising melt blending a melt-fabricable fluoropolymer having a melt flow rate (MFR) of no greater than about 7 g/10 min with milled carbon fiber and forming the resultant melt blend into an article, the carbon fiber content of said melt blend being from about 15 to 35 wt % based on the combined weight of said carbon fiber and said copolymer. The melt blending is an economical way for incorporation of the carbon fibers into the fluoropolymer, since this process can be used in conjunction with extrusion and melt cutting to form pellets than can be fed to an injection molding machine. Alternatively, the extrusion can be used to form a final product shape.

The significance of the low MFR is that the copolymer has a high melt viscosity, i.e. $7.6 \times 10^4$ poises ($7.6 \times 10^6$ Pa·s) at 372° C. Preferably, the MFR of the fluoropolymer is no greater than about 4 g/10 min. This presents difficulty to the melt blending process to be able to uniformly incorporate the high proportion of carbon fiber into the high viscosity melt of the fluoropolymer. The uniformity of incorporation is confirmed by observation of the article molded from the blend. For example, a ring-shaped article molded from the blend when applied as a seal of internal fluid pressure, which subjects the seal to expansion force, maintains the pressure seal, i.e. does not suffer creep failure It has been discovered that the use of short carbon fibers enables this melt blending to be successfully carried out on a commercially economical basis. Milled carbon fibers are short carbon fibers. The milling process fractures the long fibers obtained in the carbon fiber manufacturing process into short fibers. The carbon fibers used in the present invention preferably have an average length of no greater than about 1600 micrometers, preferably, no greater than about 400 micrometers.

One measure of creep resistance is tensile modulus. High tensile modulus is indicative of high creep resistance. Notwithstanding that short carbon fibers are used in the present invention, a substantial improvement in tensile modulus is obtained. Preferably, the tensile modulus of the fluoropolymer is increased by at least 20% by the carbon fiber addition. More preferably, the blend has a tensile modulus of at least about 800 MPa at 23° C. when the fluoropolymer is a perfluoropolymer.

The carbon fibers used in the blending process are preferably free of surface treatment, and the copolymer has preferably not been subjected to treatment that converts substantially all the polar end groups arising during the polymerization reaction, i.e. as-polymerized. Thus, the fluoropolymer preferably contains at least about 10 as-polymerized polar end groups/$10^6$ carbon atoms.

The process of the present invention achieves the best result, e.g. high increase in tensile modulus and highest creep resistance, when the melt-fabrication of the blend of fluoropolymer and carbon fiber is carried out at a higher temperature than normal, i.e. at least 20° C. greater than the standard compression molding temperature for the melt-fabricable fluoropolymer. The standard compression molding temperature is described in greater detail later herein.

Another embodiment of the present invention is the composition comprising a matrix of fluoropolymer having an MFR of no greater than about 7 g/10 min and 15 to 35 wt % of milled carbon fiber dispersed in said matrix. The carbon fiber can be further characterized by the fiber lengths and absence of surface treatment as described above. The fluoropolymer can be further characterized by the MFRs and presence of as-polymerized polar end groups as described above. The composition can be further characterized by the tensile modulus improvements described above.

DETAILED DESCRIPTION OF THE INVENTION

With respect to the melt-fabricable fluoropolymer polymer used in the present invention, these will generally fall into two categories: perfluoropolymer, wherein the monovalent atoms bonded to the carbon atoms making up the polymer backbone are all fluorine atoms and hydrofluoropolymer, wherein in addition to the fluorine monovalent atoms, hydrogen atom may also be bonded to carbon atoms making up the polymer backbone. Other atoms may be present in the polymer end groups, i.e. the groups that terminate the polymer backbone (chain). The fluoropolymer used in the present invention is a fluoroplastic, not a fluoroelastomer.

Examples of fluoropolymers that are perfluoropolymers include the copolymers of tetrafluoroethylene (TFE) with one or more polymerizable perfluorinated comonomers, such as perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers include perfluoro(methyl vinyl ether) (PMVE), perfluoro(ethyl vinyl ether) (PEVE), perfluoro(propyl vinyl ether) (PPVE), and perfluoro(butyl vinyl ether) (PBVE). The copolymer can be made using several PAVE monomers, such as the TFE/perfluoro(methyl vinyl ether)/perfluoro(propyl vinyl ether) copolymer, sometimes called MFA by the manufacturer. The preferred perfluoropolymers are TFE/HFP copolymer in which the HFP content is about 5-17 wt %, more preferably TFE/HFP/PAVE such as PEVE or PPVE, wherein the HFP content is about 5-17 wt % and the PAVE content, preferably PEVE, is about 0.2 to 4 wt %, the balance being TFE, to total 100 wt % for the copolymer. The TFE/HFP copolymers, whether or not a third comonomer is present, are commonly known as FEP. TFE/PAVE copolymers, generally known as PFA, have at least about 2 wt % PAVE, including when the PAVE is PPVE or PEVE, and will typically contain about 2-15 wt % PAVE. When PAVE includes PMVE, the composition is about 0.5-13 wt % perfluoro(methyl vinyl ether) and about 0.5 to 3 wt % PPVE, the remainder to total 100 wt % being TFE, and as stated above, may be referred to as MFA. Preferred perfluoropolymers are PFA and FEP.

With respect to hydrofluorocarbon polymers that can be used in the present invention, these polymers have repeat —$CH_2$— and —$CF_2$— units in the polymer chain and preferably have repeat —$CH_2$—$CH_2$— and —$CF_2$—$CF_2$— units in the polymer chain. Such polymers contain at least 35 wt % fluorine. Examples of hydrofluoropolymers include copolymers of vinylidene fluoride polymer (PVDF), THV polymer, which is a copolymer of TFE, HFP and vinylidene fluoride, and ETFE, which is a copolymer of ethylene and TFE). Typically ETFE contains units derived from polymerization of at least one other monomer such as perfluorobutyl ethylene ($CH_2$=$CH(C_4F_9)$ or PFBE), hexafluoroisobutylene ($CH_2$=$C(CF_3)_2$) or HFIB), perfluoro(alkyl vinyl ether) (PAVE), or hexfluoropropylene (HFP). This third monomer, the termonomer, is present in the amount of 0.1 to 10 mole % based on the total moles of ethylene and TFE. The molar ratio of ethylene to TFE is in the range of about 30:70 to 70:30, preferably about 35:65 to 65:35, and more preferably about 40:60 to 60:40. ETFE polymer is described in U.S. Pat. Nos. 3,624,250, 4,123,602, 4,513,129, and 4,677,175.

The fluoropolymers used in the present invention have polar end groups arising during the polymerization reaction, either from the initiator used, chain transfer agent, and/or ammonium buffer. These end groups are polar in contrast to the non-polar stable end groups resulting from the most common end group stabilizing chemical treatments, humid heat treatment yielding —$CF_2H$ end groups and fluorination yielding —$CF_3$ end groups. The polar end groups are characterized by one or more of being ionic or capable of hydrogen bonding and do not contain the carbon/halogen bond, Examples of polar end groups are the carboxylic acid (—COOH) and derivatives thereof, e.g. ester (—$COCH_3$), amide (—$CONH_2$) and acid fluoride (—COF), alcohol (—$CH_2OH$), and vinyl (—CF=$CF_2$). The presence of polar end groups promotes the dispersion of the carbon fibers into the fluoropolymer and provides improved tensile modulus for the resultant blend.

Preferably, at least about 20 as-polymerized polar end groups per $10^6$ carbon atoms are present. The preferred end group is —COOH. Preferably, the fluoropolymer contains at least about 10 per $10^6$ carbon atoms, more preferably, at least about 20 per $10^6$ carbon atoms of the —COOH end groups. Stabilization of fluoropolymer end groups by exposing the fluoropolymer to fluorine typically converts substantially all as-polymerized end groups to the —$CF_3$ stable end group. U.S. Pat. No. 4,626,587 (Morgan and Sloan) discloses the effect of fluorine treatment of FEP. Table III shows the fluorination results for three FEP polymers, each having a large —CF=$CF_2$ end group population, and one having a large —COOH end group population, wherein the —CF=$CF_2$ end group population is greatly reduced and 51 —COOH end groups (Monomer) are reduced to 7. U.S. Pat. No. 4,743,658 (Imbalzano and Kerbow) discloses the fluorination treatment of PFA having at least 80 (total) per $10^6$ carbon atoms of the following end groups: —COF, —$CH_2OH$, and —$CONH_2$, which are reduced to no more than 6 of these end groups (total) per $10^6$ carbon atoms. U.S. Pat. No. 3,085,083 (Schreyer) discloses the humid heat treatment of FEP to convert unstable end groups to the stable —$CF_2H$ end group. Reaction of FEP with ammonia is also disclosed in Schreyer Table 1 resulting in the virtual disappearance of —COOH end groups. The end group population desired for the fluoropolymer used in the present invention can be obtained by not subjecting the fluoropolymer such as PFA to end group treatment or by fluorine treatment that is less than complete in converting unstable end groups to the —$CF_3$ stable end groups. If not fluorine treated, FEP is subjected to humid heat treatment, and this can also be carried out incompletely to retain as-polymerized polar end groups.

The fluoropolymers used in the present invention are melt-fabricable, i.e. there are melt-processible by such common molding techniques as extrusion and injection molding to form articles that exhibit toughness so as make them useful. This toughness arises from the fluoropolymer having a high molecular weight, to form a melt that has a low melt flow rate (MFR). Thus, the fluoropolymers used in the present invention have an MFR of no greater than about 7 g/10 min. MFR is measured according to ASTM D-1238-94a and following the detailed conditions disclosed in U.S. Pat. No. 4,380,618, at the temperature which is standard for the resin (see for example ASTM D 2116-91a and ASTM D 3307-93 that are applicable to the most common melt-fabricable fluoropolymers (FEP and PFA), both specifying 372° C. as the resin melt temperature in the Plastometer®) and ASTM D 3159 specifying 297° C. for ETFE. Thus, MFR is the rate at which molten polymer is extruded through the orifice of a Plastometer® in units of g/10 min. Preferably the MFR of the fluoropolymer used in the present invention is no greater than about 4 g/10 min, and more preferably, no greater than about 3 g/10 min. For each of these maximum MFR, it is preferred that the MFR is at least 0.5 g/10 min, more preferably at least 1 g/10 min.

Since, low MFR is difficult to melt-fabricate because of its high melt viscosity, most fluoropolymers are made to have higher MFRs to facilitate melt fabrication. The present invention requires the use of low MFR fluoropolymer to, in combination with the milled carbon fiber, achieve the high tensile modulus needed for high resistance to creep, both at room temperature and elevated temperature. Typically, the tensile modulus for low MFR fluoropolymers will be no greater than about 600 MPa at 23° C.

The carbon fiber added to the fluoropolymer includes the PAN-based carbon fibers derived from carbonizing an organic filamentary material and pitch-based carbon fibers, i.e. derived from fiber spinning from pitch. Preferably the carbon fiber has a high tensile modulus of at least about 150 GPa (21750000 psi) at 23° C., preferably at least about 400 GPa at 23° C. Preferably, the diameter of the carbon fiber is about 5-15 micrometers and the short fiber length is that which is obtainable by milling by the carbon fiber manufacturer, which is sold as milled carbon fiber. Preferably, the average length of the carbon fiber is no greater than about 300 micrometers, more preferably, no greater than about 200 micrometers. The average fiber length of the carbon fiber is determined by the manufacturer/supplier by measurement of fiber lengths under magnification. The carbon fiber has no surface treatment. The fibers are thus free of surface coating, e.g. free of sizing, and other surface treatments that change the chemistry of the carbon fiber surface such as by oxidation or halogenation.

Preferably, the carbon fiber content of the blend with the fluoropolymer is about 15 to 30 wt %, more preferably about 18 to 28 wt %, based on the combined weight of the carbon fiber and fluoropolymer.

The carbon fiber can be blended with the fluoropolymer simply by separately feeding the fluoropolymer and carbon fiber to an extruder that has mixing capability. This can be a twin screw extruder or a single screw extruder, wherein the extruder screw has a mixing section. The fluoropolymer can be in powder form or pellet form, having been previously extruded, wherein the extrudate is melt cut into pellet form. The carbon fiber can be metered into the extruder upstream of the mixing section in an amount to obtain the concentration desired in the resultant melt blend. Preferably, the carbon fiber is force fed into the extruder barrel, i.e. by an auger that feeds the carbon fiber into the interior of the extruder barrel under pressure. The mixing of the molten fluoropolymer with the added carbon fiber achieves a uniform dispersion of the carbon fibers within the resultant fluoropolymer matrix. Typically, the melt blend will be extruded and melt cut to obtain pellets that can be used for final melt fabrication, most often by injection molding.

The resultant molded article has high tensile modulus, which confirms the uniform dispersion of the carbon fibers in the fluoropolymer matrix. At 23° C., the tensile modulus is preferably at least 800 MPa when the fluoropolymer is perfluoropolymer. At elevated temperature of the fluoropolymer forming the matrix, the tensile modulus is preferably at least 25% of the tensile modulus at 23° C. For PFA, the elevated temperature for this measurement is 200° C.

It has been discovered that molding temperature affects the improvement in properties imparted to the blend of fluoropolymer and carbon fibers. Surprisingly, when the molding temperature is greater than the standard compression molding temperature for the fluoropolymer by itself used to make tensile test specimens, the property improvement is substantially greater. The standard compression molding temperature, which varies for each fluoropolymer, is the optimum molding temperature, i.e. to achieve optimum tensile test results, and is disclosed in the ASTM specification for particular fluoropolymers, as follows:

| Fluoropolymer | ASTM Specification | Compression Molding Temp. ° C. |
|---|---|---|
| PFA | D 3307 | 380 |
| FEP | D 2116 | 325 |
| ETFE | D 3159 | 300 |

The compression molding temperature for other melt-fabricable fluoropolymers is found in their respective ASTM specifications. It has been discovered that when the melt-fabrication (molding) temperature, the melt temperature, is at least 20° C. greater than the standard compression molding temperature, the improvement at least in tensile modulus is at least 50% greater than the tensile modulus of the fluoropolymer by itself. Thus, for PFA, the preferred molding (melt) temperature is at least 400° C., but not so high that polymer degradation occurs. PFA can be molded at a melt temperature of about 420° C. without polymer degradation.

EXAMPLES

Tensile modulus is measured compression molded test specimens as described in ASTM D 3307 at 23° C. except that instead of the compression molding temperature of 380° C. specified tensile testing specimen preparation disclosed in the ASTM specification, 420° C. is used.

The fluoropolymer used in this Example is PFA containing about 3.5 wt % PPVE and having an MFR of 2 g/10 min and the following end-group population/$10^6$ carbon atoms: 3 —COF, 16 —CONH$_2$, and 61 —COOH (as monomer and dimer). The PFA is in the form of pellets having an average size of 2.5 mm in diameter and 2.5 mm in length and exhibits a tensile modulus of 578 MPa at 23° C. and 37 MPa at 200° C.

The carbon fiber used in this Example is milled carbon fiber, free of surface treatment, and having an average diameter of about 7 micrometers, average length of about 94 micrometers and tensile modulus of 228 GPa (33,100,000 psi).

The tensile modulus of the blend at 23° C. is 966 MPa and at 200° C. is 311.5 MPa. The improvement in 23° C. tensile modulus is 67%.

To prepare the blend in a form convenient for feeding to injection molding, the PFA pellets are fed to a twin screw extruder and, the melt temperature reached within the extruder is about 370° C. The carbon fiber is fed by using an extruder auger forcing the carbon fiber into the extruder barrel and into contact with the fluoropolymer being forced by the extrusion screw into the mixing section, wherein the milled carbon fibers become uniformly dispersed within the PFA matrix. The chilled extrudate is chopped into pellets 2.5 mm in diameter and 2.5 mm long. The feed rate of the PFA and carbon fibers into the extruder is controlled to obtain a 26 wt % carbon fiber content in the PFA, Based on the combined weight of the carbon fiber and the PFA. The MFR of the blend is 0.65 g/10 min.

When this melt blending is carried out with chopped carbon fiber having an average length of greater than 2 mm, the carbon fiber is not uniformly blended with the fluoropolymer as indicated by the extruded strand fracturing prior to cutting, preventing the formation of the blend into uniformly shaped pellets for feeding at the injection molding machine. The pellets that are obtainable are difficult to inject mold in the sense that mold filling with molten blend is inconsistent.

Injection molding of the pellets at a melt temperature of 420° C. into a collar shape and subjecting this shape to internal fluid pressure under conditions where the collar has to resist creep in order to maintain such internal pressure is successful. In contrast, when the same collar is molded at 420° C. from a PFA that has an MFR of 14 g/10 min blended with the same carbon fiber, in the same way and same amount, the resultant collar fails to maintain the internal pressure, as manifested by leaking of the pressurized fluid from the edges of the collar. When the collar made of the blend containing the 2 MFR PFA is injection molded at a temperature of 380° C., the collar fails to maintain the same internal pressure.

The invention claimed is:

1. Composition comprising a matrix of fluoropolymer having an MFR of no greater than about 7 g/10 min and 15 to 35 wt % of milled carbon fiber having a length of no greater than about 1600 micrometers dispersed in said matrix.

2. The composition of claim 1 having a tensile modulus of at least about 800 MPa at 23° C. and wherein said fluoropolymer is a perfluoropolymer.

3. The composition of claim 1 wherein said carbon fibers are free of surface treatment.

4. The composition of claim 1 wherein said fluoropolymer contains at least about 10 as polymerized polar end groups/ $10^6$ carbon atoms.

5. The composition of claim 1 wherein said MFR is no greater than about 4 g/10 min.

6. The composition of claim 1 wherein the average length of said carbon fibers is no greater than about 1600 micrometers.

7. The composition of claim 1 wherein said carbon fibers have an average length of no greater than about 400 micrometers.

8. The composition of claim 1 wherein said fluoropolymer is perfluoropolymer.

9. The composition of claim 8 wherein said perfluoropolymer is a copolymer of tetrafluoroethylene and at least one monomer selected from the group consisting of hexafluoropropylene and perfluoro(alkyl vinyl ether).

* * * * *